3,526,605
EXPANDABLE STYRENE POLYMERS
Alvin R. Ingram, Murrysville, Pa., assignor to
Sinclair-Koppers Company, a partnership
No Drawing. Filed May 13, 1968, Ser. No. 728,742
Int. Cl. C08f 47/10; C08j 1/26
U.S. Cl. 260—2.5          5 Claims

ABSTRACT OF THE DISCLOSURE

The production of expandable styrene polymers that have an exceptionally low molding temperature and yet retain good fusion properties is carried out by impregnating blowing agents such as n-pentane into styrene polymer particles, which are suspended in water, in the presence of 0.5–2.5 percent by weight of styrene polymer of a rosin acid derivative selected from abietic acid, hydroabietic acid or its esters, and hydroabietyl phthalate.

BACKGROUND OF THE INVENTION

The utility of expandable styrene polymers is well known. A problem present when such polymers are expanded is the high temperatures necessary for the good fusion to result on expansion. When temperatures below about 250° F. are used during molding of expandable styrene polymers, fusion properties decrease drastically. Somewhat lower temperatures, about 240–250° F. are possible where self-extinguishing additives are present in the styrene polymer, but generally styrene polymers do not provide adequate fusion at temperatures below about 240–250° F.

I have found that if limited amounts of certain rosin acid derivatives are added to styrene polymers, during the stage of blowing agent impregnation of substantially completely polymerized styrene polymers, expandable styrene polymers are produced which can be molded at temperatures below about 240° F., even as low as 225° F., and yet provide good fusion and do not shrink away from the mold walls.

SUMMARY OF THE INVENTION

In accordance with the process of the present invention, styrene polymer particles are impregnated with blowing agents in the presence of a rosin acid derivative selected from abietic acid, hydroabietic acid and lower alkyl esters thereof and hydroabietyl phthalate, the rosin acid derivative being present in about 0.5–2.5 percent by weight of the styrene polymer.

DETAILED DESCRIPTION

The expandable styrene polymer particles which provide good fusion at molding temperatures below about 240° F. are prepared by impregnating the blowing agent in the presence of specific rosin acid derivatives.

One of the rosin acid derivatives useful in the present process is abietic acid, $C_{19}H_{29}COOH$, structurally described as:

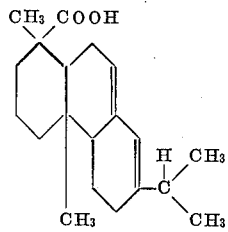

a major component of rosin, the resinous material obtained from pine trees. Other rosin acid derivatives useful are the hydrogenation product of abietic acid, hydroabietic acid, and lower alkyl esters of this hydrogenated product. Especially useful is the methyl ester of hydroabietic acid. It is significant to note that the methyl ester of abietic acid, the unsaturated ester, is unsuitable for use in the present process because of its tendency to cause the formation of clusters of beads during the impregnation step. The recovered beads from these clusters did not yield foams of the desired low-temperature fusion characteristics.

In addition to abietic acid, hydroabietic acid and lower alkyl esters of hydroabietic acid, the reaction product of hydroabietyl alcohol and phthalic acid, hydroabietyl phthalate, are usable.

In accordance with this invention, a variety of expandable thermoplastic homopolymers and copolymers can be prepared which are derived from vinyl aromatic monomers including styrene, divinylbenzene, vinyl toluene, isopropylstyrene, alpha-methylstyrene, nuclear dimethylstyrene, chlorostyrene, vinylnaphthalene, etc., as well as polymers prepared by the copolymerization of a vinyl aromatic monomer with monomers such as butadiene, alkyl methacrylates, alkyl acrylates, and acrylonitrile wherein the vinyl aromatic monomer is present in at least 50% by weight. For the purposes of convenience, these polymers are referred to herein as styrene polymers. The styrene polymers can, of course, be produced by various conventional bead polymerization techniques.

The rosin acid derivatives are especially useful in the preparation of low-temperature-molding, expandable self-extinguishing styrene polymers. Such self-extinguishing styrene polymers are known in the art, including those described in U.S. Pat. No. 3,058,926, containing an organic bromide and an organic peroxide. The amount of rosin acid derivative to the added to the styrene polymer can range from 0.5–2.5 percent by weight of the polymer. Below this range, the low temperature fusion properties are not present in the polymer product, while amounts in excess of about 2.5% result in bead agglomeration during the bead impregnation. The preferred range is in the order of 1.0–2.0 percent.

The rosin acid derivative is added to the styrene polymer particles after the particles have been substantially completely polymerized (hard bead impregnation). In the process, the addition is carried out by adding the rosin acid derivative to the aqueous suspension in which the particles were prepared or preferably, the particles can be separated from the aqueous suspension, for example, in order to remove any off-size particles by screening prior to impregnation with blowing agent, and then suspended in an aqueous medium.

Where the particles are suspended, suspending agents are added to the water to keep the particles from agglomerating at the elevated temperatures employed during the impregnation process. Suitable suspending agent systems, for example, those inorganic suspending agents described in D'Alelio Pat. No. 2,983,692 such as tricalcium phosphate in combination with an anionic surface active agent, and organic suspending agents described in Buchholtz et al. U.S. Pat. No. 2,950,261.

The impregnation is conventionally carried out at temperatures ranging from about 80° to 120° C. Increasing the temperatures makes the impregnation proceed at a faster rate.

The blowing agents are compounds which are gases or which will produce gases on heating. Preferred blowing agents include aliphatic hydrocarbons containing from 1–7 carbon atoms in the molecule, for example, petroleum ether or methane, ethane, propane, butane, pentane, hexane, heptane, cyclohexane and their halogenated derivatives which boil at a temperature below the softening point of the polymer.

The invention is further illustrated by the following examples wherein parts are parts by weight unless otherwise indicated.

EXAMPLE I

To a polymerization reactor, there was charged in the following order, 100 parts of water, 3.0 parts of tricalcium phosphate, 0.02 part dodecylbenzene sodium sulfonate, 1.0 part sodium chloride, 100 parts of polystyrene beads (containing 2.2% of an organic bromide and 0.35% organic peroxide) and 6.4 parts n-pentane admixed with 2.0 parts methyl ester of hydrogenated rosin (Hercolyn D). The mixture was heated, with agitation, to 110° C. during 2 hours and held at 110° C. for 6 hours. The mixture was cooled to room temperature and HCl added to a pH of 1.4. The beads were separated from the aqueous phase by centrifuging, washed with water and air dried at room temperature. The n-pentane content of the beads was 6.1%. A portion of the beads was exposed to steam at atmospheric pressure for three minutes. A portion of the foam particles (Particles A) were aged overnight and the bulk density in pounds per cubic foot was found to be 0.87. Portions of Particles A were charged into a 5 x 5 x 0.5 inch frame on a platen heated to 230° F. It was covered by a piece of aluminum foil which was sprayed with about one ml. of water (to generate steam in situ). The press was cooled for one minute, the top platen being heated the same temperature as the bottom. The foam was aged one day, weighed (to determine density) and the foam block broken. The number of broken foam particles in a cross-section of 100 particles indicates the percent fusion. The block formed from Particles A had a density of 1.1 and showed 55–60 percent fusion. Untreated self-extinguishing expandable polystyrene (Particles B) beads, containing a comparable n-pentane content (6.1%), gave a foam product having a bulk density of 1.02 and only 0–5% fusion.

EXAMPLE II

The procedure of Example I was repeated using 2.0 parts of other rosin acid derivative in place of the methyl ester of hydrogenated rosin. The derivative used and the results of 3-minute pre-puffing and of low-temperature (230° F.) molding of 5 x 5 x 0.5 inch specimens for one minute are listed in Table I.

TABLE I

| Rosin acid derivative | n-Pentane content of beads (percent) | Pre-puff density (p.c.f.) | Molding density (p.c.f.) | Fusion (percent) |
|---|---|---|---|---|
| None | 6.1 | 1.02 | 1.2 | 0–5 |
| Hydroabietic acid | 6.3 | 0.87 | 1.1 | 45–50 |
| Abietic acid | 5.9 | 0.99 | 1.4 | 30–35 |
| Hydroabietyl phthalate | 6.3 | 0.84 | 1.2 | 35–40 |

EXAMPLE III

Three experiments were run to determine the amount of rosin acid derivative necessary to give the good fusion at low-temperature molding of styrene polymer beads. The procedure used in the experiments was the same with variation of the amount of additive. To a polymerization reactor, there was charged 120 parts water, 3.2 parts tricalcium phosphate, 0.032 Nacconol NRSF, as a surfactant, n-pentane (amount listed in Table II) having dissolved therein methyl ester of hydroabietic acid (amount varied as listed in Table II). Eightly parts of self-extinguishing expandable styrene polymer beads (containing 5.2% of a mixture of iso-pentane and n-pentane; of bead size −16 +25 mesh). The mixture was agitated and heated 6 hours at 110° C., cooled to room temperature, acidified with HCl to pH of 1–2, washed with water, centrifuged and the beads air dried. The beads were heated 3 minutes in steam and aged overnight. The aged beads were molded and the percent fusion determined as in Example I. The results of the experiments are listed in Table II.

TABLE II

| Experiment No. | Rosin acid derivative (wt. percent on beads) | Bead agglomeration | n-Pentane in Beads (percent) | Molding for 1 minute Temp. (° F.) | Molding for 1 minute Fusion (percent) |
|---|---|---|---|---|---|
| A | 0.5 | None | 6.51 | 225 | 20–30 |
| B | 1.0 | do | 6.57 | 225 | 60–79 |
| C | 3.0 | Complete | | | |

It can be seen that at about 0.5% by weight of the rosin acid derivative the properties of the beads with respect to low temperature fusion begin to fall while the use of greater than about 2.5 weight percent causes agglomeration of the beads during the impregnation and renders them unusable.

EXAMPLE IV

The criticality of the use of the specific rosin acid derivatives described herein was illustrated by carrying out a series of experiments using 2.0 weight percent of various other rosin acid derivatives generally according to the procedure of Example I. The use of methyl ester of non-hydrogenated rosin (methyl abietate); the diethylene glycol ester of rosin; glyceryl hydroabietate; and glyceryl abietate gave either agglomeration of the beads or essentially no fusion of the beads at 225° F. molding temperatures.

What is claimed is:
1. A process for making expandable styrene polymer particles which provide good fusion properties at molding temperatures between about 225–240° F. comprising suspending styrene particles, which have been substantially completely polymerized, in an aqueous medium and impregnating a blowing agent into said particles in the presence of 0.5–2.5% by weight of styrene polymer of a rosin acid derivative selected from the group consisting of abietic acid, hydroabietic acid and lower alkyl ester thereof, and hydroabietyl phthalate.
2. The process of claim 1 wherein said rosin acid derivative is present in about 1–2% by weight of polymer.
3. The process of claim 1 wherein said rosin acid derivative is the methyl ester of hydroabietic acid.
4. Expandable styrene polymer particles which provide good fusion properties at molding temperatures of 225–240° F. characterized in that said particles contain 0.5–2.5% by weight of a rosin acid derivative selected from the group consisting of abietic acid, hydroabietic acid and lower alkyl esters thereof and hydroabietyl phthalate.
5. The styrene polymer particles of claim 4 wherein said rosin acid derivative is the methyl ester of hydroabietic acid.

References Cited

UNITED STATES PATENTS 3,207,712  9/1965  Andrews et al.
3,324,052  6/1967  Zuern et al.
3,389,097  6/1968  Ingram et al.

MURRAY TILLMAN, Primary Examiner

M. FOELAK, Assistant Examiner

U.S. Cl. X.R.

260—27, 93.5